United States Patent
Galle et al.

(10) Patent No.: US 7,048,998 B2
(45) Date of Patent: May 23, 2006

(54) ADHESIVE TAPE FOR WRAPPING PURPOSES

(75) Inventors: André Galle, Hamburg (DE); Dieter Wenninger, Singapore (SG); Bernhard Müssig, Seevetal (DE); Stefan Röber, Hamburg (DE); Herbert Sinnen, Pinneberg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/333,879

(22) PCT Filed: Jul. 27, 2001

(86) PCT No.: PCT/EP01/08740

§ 371 (c)(1),
(2), (4) Date: Jun. 2, 2003

(87) PCT Pub. No.: WO02/10300

PCT Pub. Date: Feb. 7, 2002

(65) Prior Publication Data

US 2003/0186050 A1    Oct. 2, 2003

(30) Foreign Application Priority Data

Jul. 27, 2000    (DE) .............................. 100 36 707

(51) Int. Cl.
*C09J 7/02* (2006.01)
*B32B 7/12* (2006.01)

(52) U.S. Cl. ...................... 428/356; 428/343; 428/354; 428/204; 428/906

(58) Field of Classification Search ................ 428/356, 428/343, 354, 204, 906
See application file for complete search history.

(56) References Cited

U.S. PATENT DOCUMENTS

| 4,576,854 A | 3/1986 | Kurahashi .................... 428/204 |
| 6,777,490 B1 * | 8/2004 | Mussig et al. ................. 525/55 |

FOREIGN PATENT DOCUMENTS

| DE | 1 569 900 | 7/1969 |
| DE | EP 0 960 923 A | 12/1999 |
| JP | 56030481 | 3/1981 |
| WO | WO 94/24221 | 10/1994 |

OTHER PUBLICATIONS

Eastman Product Data sheet for Tacolyn 1070 Hydrocarbon Resin Dispersion.*
Eastman Product Data Sheet for Tacolyn 100 Resin Dispersion.*
AN 1982:210119 HCAPLUS—JP 56125474.
Derwent Publications Ltd., London, AN1999-586172 XP002181908, Sep. 21, 1999.
Derwent Publications Lte., London, AN 1998-589925 XP002181909, Oct. 6, 1998.
Specification of U.S. Appl. No. 09/320,097.

* cited by examiner

*Primary Examiner*—Daniel Zirker
(74) *Attorney, Agent, or Firm*—Norris McLaughlin & Marcus PA

(57) ABSTRACT

An adhesive tape comprising a polyvinyl chloride film having an adhesive layer formed from a mixture of a natural rubber latex and a dispersion of an aromatic modified hydrocarbon resin.

9 Claims, No Drawings

ADHESIVE TAPE FOR WRAPPING PURPOSES

This is a 371 of PCT/EP01/08740 filed 27 Jul. 2001 (international filing date). The invention relates to an adhesive tape comprising a polyvinyl chloride-based backing unilaterally coated with a solvent-free, aromatics-modified adhesive based on natural rubber latex, to the use of said adhesive tape as packaging tape, and to the use of an adhesive tape comprising a polyvinyl chloride-based backing unilaterally coated with a solvent-free adhesive based on natural rubber latex, likewise as a packaging tape.

BACKGROUND OF THE INVENTION

Adhesive tapes with films based on polyvinyl chloride and with adhesive compositions based on solvent-containing natural rubber are known and are supplied by known manufacturers.

A description of such tapes is given, for example, in "Packaging Tapes" by Stefan Röber in Handbook of Pressure Sensitive Adhesive Technology, Third Edition, edited by Donatas Satas, Satas & Associates, Warwick, R.I. pp. 787–814. Further descriptions can be found in European Adhesives & Sealants 10(4), 1993, 29, by G. Pedala, and European Adhesives & Sealants 2(2), 1985, 18, by R. W. Andrew.

Owing to the known disadvantages associated with the production of solvent-containing adhesive tapes, such as, for example, the difficulty of recycling solvents, the emission of solvent to the environment, the workplace hazard due to highly flammable solvents, and the restriction on coating speed imposed by the drying of the adhesive composition, solvent-free technologies for producing adhesive tapes are advancing in importance.

A disadvantage to add to the above-described problems of the solvent technology is the need to break down the natural rubber during the production of the adhesive composition, in a process known as mastication. This results in the adhesive composition having a cohesiveness which decreases markedly in accordance with the extent of breakdown under mechanical load.

The deliberate industrial process of breaking down rubber under the combined action of shear stress, temperature, and atmospheric oxygen is referred to in the technical literature as mastication and is generally carried out in the presence of chemical auxiliaries, which are known from the technical literature as masticating agents or peptizers, or, more rarely, as "chemical plasticizing aids".

In rubber technology, the mastication step is needed in order to make it easier to integrate the additives.

According to Römpp (Römpp Lexikon Chemie—Version 1.5, Stuttgart/New York: Georg Thieme Verlag 1998) mastication is a term used in rubber technology for the breaking down of long-chain rubber molecules in order to increase the plasticity and/or reduce the (Mooney) viscosity of rubbers. Mastication is accomplished by treating, in particular, natural rubber in compounders or between rolls at very low temperatures in the presence of masticating agents. The high mechanical forces which this entails lead to the rubber molecules being "torn apart", with the formation of macro radicals, whose recombination is prevented by reaction with atmospheric oxygen. Masticating agents such as aromatic or heterocyclic mercaptans and/or their zinc salts or disufides promote the formation of primary radicals and so accelerate the mastication process. Activators such as metal (iron, copper, cobalt) salts of tetraazaporphyrins or phthalocyanines permit a reduction in the mastication temperature. In the mastication of natural rubber, masticating agents are used in amounts from about 0.1 to 0.5% by weight in the form of masterbatches, which facilitate uniform distribution of this small amount of chemicals in the rubber mass.

Mastication must be clearly distinguished from the breakdown known as degradation which occurs in all of the standard solvent-free polymer technologies such as compounding, conveying, and coating in the melt.

Degradation is a collective term for different processes which alter the appearance and properties of plastics. Degradation may be caused, for example, by chemical, thermal, oxidative, mechanical or biological influences or else by exposure to radiation (such as (UV) light). Consequences are, for example, oxidation, chain cleavage, depolymerization, crosslinking, and/or elimination of side groups of the polymers. The stability of polymers toward degradation may be increased by means of additives: for example, by adding stabilizers such as antioxidants or light stabilizers.

The use of adhesive compositions of this kind based on natural rubber hotmelt pressure-sensitive adhesives for adhesive tapes, especially packaging tapes, for sealing cartons made from recycled paper, or cardboard packaging, results in premature opening of the cartons. If there is sufficiently great tension across the lid of the carton, caused by the pressure of the packaged material in the carton or by the tension of the packaging material, which opposes sealing, the adhesive tape becomes detached from the surface of the carton and the carton opens as result of slippage of the packaging tape.

The cohesion and, with it, the packaging security afforded by adhesive tapes with an adhesive composition based on natural rubber may be improved either by crosslinking the rubber adhesive composition and/or by means of a variant preparation of the adhesive composition in the course of which the natural rubber used is broken down to a much-reduced extent and therefore has a higher molecular weight. This makes it possible to counter slippage of the adhesive tapes on the carton surface, as described above.

Adhesive tapes with a backing based on PVC, in combination with an adhesive based on acrylate dispersions, are not possible owing to the high polarity of the adhesive and the resultant extremely high unwind forces.

Solvent-free technologies for producing adhesive tapes, especially packaging tapes, have to date been restricted to the use of adhesive composition based on acrylate dispersions and to the use of melting, thermoplastic elastomers.

An advantage of these thermoplastic elastomers, predominantly block copolymers containing polystyrene blocks, is the relatively low softening point and the corresponding simplification of the application or coating process, and also the avoidance of the above-described disadvantages of the solvent-based technologies.

The unfavorable aging behavior and the profile of properties of such packaging tapes at elevated temperatures, the poor thermal stability, lead to premature opening of the cartons packaged with these tapes and/or a packaging tape performance profile which generally has some adverse features. Moreover, the process temperatures, which are very high in some cases, are detrimental to certain types of adhesive composition.

Further solvent-free systems based on aqueous adhesives, such as adhesive systems based on polyvinyl acetate, polyvinyl acetate-ethylene copolymers, neoprene, styrene-butadiene, polyurethane and polyvinyl alcohol, for example, are used little if at all owing to a costs and/or performance structure which is unfavorable for adhesive tapes, particularly packaging tapes.

An overview of the most important aqueous adhesive systems and also their use is given in "Solvent free adhesives", T. E. Rolando (H. B. Fuller) in Rapra Rev. Rep. 1997, 9(5), 3–30 Rapra Technology Ltd.

Various routes to the solvent-free preparation and processing of pressure-sensitive rubber adhesives are known.

An overview of such adhesive compositions and their use in the field of pressure sensitive adhesives (PSAs) is given in "Natural Rubber Adhesives" (G. L. Butler in Handbook of Pressure Sensitive Adhesive Technology, Third Edition, edited by Donata Satas, Van Nostrand Reinhold New York, pp. 261–287).

All of the known processes are characterized by very extensive rubber breakdown. For the further processing of the compositions for self-adhesive tapes, this necessitates extreme crosslinking conditions and also has the consequence of an application profile which is to some extent restricted, especially as regards the use of resultant self-adhesive tapes at relatively high temperatures.

Solvent-free hotmelt PSAs based on nonthermoplastic elastomers, such as natural rubber or other high molecular weight rubbers, for example, lack sufficient cohesion for the majority of applications, in the absence of a step of crosslinking the adhesive composition, and are therefore unsuited to use in the context of an adhesive packaging tape. The reason for this failure of noncrosslinked adhesive compositions based on natural rubber is the relatively large reduction in molecular weight as a result of processing, and/or as a result of the preparation process of the adhesive compositions based on natural rubber, and the resultant reduced or inadequate cohesion of the adhesive compositions.

CA 698 518 describes a process for achieving production of a composition by adding high proportions of plasticizer and/or by simultaneously strong mastication of the rubber. Although this process can be used to obtain PSAs having an extremely high tack, the achievement of a user-compatible shear strength is possible only to a limited extent, even with a relatively high level of subsequent crosslinking, owing to the relatively high plasticizer content or else to the severe breakdown in molecular structure of the elastomer to a molecular weight average of $M_w \leq 1$ million.

The use of polymer blends, where besides nonthermoplastic natural rubber use is also made of block copolymers, in a ratio of approximately 1:1, represents essentially an unsatisfactory, compromise solution, since it results neither in high shear strengths when the self-adhesive tapes are used at relatively high temperatures nor in significant improvements on the properties described in CA 698 518.

Raw natural rubber latex is supplied from the plantations and is purified, preserved, and concentrated by means of appropriate methods. A general description of the types of latex and methods of processing is given in "Naturkautschuk—Technisches Informationsblatt" [Natural rubber—technical information sheet], Malaysian Rubber Producers Research Association, L1, 1977, and in "Kautschuktechnologie" [Rubber technology], Werner Hofmann, Gentner Verlag, Stuttgart p. 51 ff.

Natural rubber latex is harvested as a natural product from trees known as latex trees. After various processing steps for separation and purification, four basic types of natural rubber lattices are distinguished:

1. Standard natural rubber latex with a high ammonia content of 0.7% by weight
2. Natural rubber latex with a low ammonia content of 0.2% by weight in combination with zinc oxide and tetramethylthiuram disulfide<0.035% by weight
3. Natural rubber latex doubly centrifuged, of particularly high purity
4. Natural rubber latex partly vulcanized, for specialty applications Mastication and the associated breakdown of the natural rubber is not necessary when preparing adhesive compositions based on natural rubber latex, since in the case of the solvent-free aqueous adhesive composition the simple mixing of the components is not accompanied by mastication and thus by a breakdown of the molecule under mechanical load. This results in a close interlooping of the natural rubber latex/isoprene molecules, a high molecular weight owing to absence of mastication, a broad molecular weight distribution, and a low softening point $T_g$.

These factors result in a very good balance between cohesion and adhesion in the adhesive composition resulting from resin blends, and also in a profile of properties which is of very high performance for adhesive tapes, over a very wide temperature range.

These positive characteristics over a wide temperature range are exploited for the adhesive tape described in JP 56 030 481, comprising an adhesive composition based on natural rubber latex. Through the use of the natural rubber latex, a robustness to impact at low temperatures is described.

A further point is that natural rubber latex features a particularly wide spectrum of applications. Thus natural rubber latex is suitable on the one hand for use as an adhesive composition for packaging materials and on the other hand for applications outside of adhesive technology.

A disadvantage of adhesive composition systems based on natural rubber latex is the poor stability of the natural rubber latex raw material to mechanical load and the associated coagulation of the natural rubber latex in the adhesive composition. This sensitivity to shearing restricts the ease of handling and the usefulness of the natural rubber latex for adhesive composition technology and the adhesive tape industry. The production of adhesive tapes for which the adhesive composition comprising natural rubber latex can be coated at high speed onto a film is not known.

Through the use of stabilizing resin dispersions and/or surface-active substances, such as emulsifiers, for example, it is possible to increase significantly the stability of the natural rubber latex. However, increasing the stability of natural rubber latex using surface-active substances at high concentrations goes hand in hand with a drastic loss of cohesion of the adhesive composition, with the consequence that adhesive compositions modified in this way cannot be used for packaging tapes.

The general use of natural rubber latex for adhesive compositions and also latex-stabilizing resin dispersions is described in "Tackified waterborne adhesive for PSA tapes", J. G. de Hullu, European Adhesives & Sealants, 12 (1998), p. 11–12. Through the use of such natural rubber latex-stabilizing resin dispersions, it becomes possible to process or coat adhesive compositions based on natural rubber latex. The trouble-free application of the dispersion adhesive compositions to a polymeric backing enables an industrially practicable and economically rational adhesive tape production process. The use of this technology is made possible by employing a suitable adhesive composition and by technically setting and optimizing the coating lines.

The application and development of an adhesive tape which unwinds quietly and is suitable for packaging applications has not been described in this context. The use of adhesive tapes with quiet unwind, particularly for carton sealing, however, is of great importance within the packaging industry in order to reduce the noise load in the packing houses and hence to increase work performance. The capacity for quiet unwinding is of fundamental importance in order to position an adhesive packaging tape within the middle to top price/performance segment.

In general terms, natural rubber latex is a known component of adhesive compositions and is described, inter alia, in patents. The fields of use of such adhesive compositions based on natural rubber latex are applications in the sector of labels and plaster technology.

What has not been disclosed, however, is the application of the adhesive to a continuous, PVC-based backing. Both properties are essential for the use of adhesives based on natural rubber latex.

The preparation of aqueous adhesive compositions based on natural rubber latex is known. These adhesive compositions are used as described above for producing self-adhesive labels. This is done using the customary methods of preparing dispersion adhesives.

The preparation of adhesive composition systems which comprise natural rubber latex is likewise described in EP 0 960 923 A1. This discloses not only the preparation of dispersion adhesive compositions but also the incorporation of natural rubber latex into other natural rubber adhesive systems using compounders, mixers or extruders. The adhesive compositions prepared in this way may be coated onto film or nonwoven. An improvement in the packaging properties of such adhesive tapes by means of a controlled, enduring crosslinking of the adhesive composition, which also may be used as part of a rational production process, has not been described.

When using adhesive composition variants based on natural rubber latex it is the case —as already set out above—that enduring crosslinking is unnecessary for achieving good packaging qualities that are superior to the majority of other adhesive composition systems.

Through the use of the above-described stabilizing resin dispersions and also by using natural rubber latex, and accordingly in the absence of any mechanical breakdown of the rubber whatsoever, it is possible to prepare, process, and apply adhesive compositions based on natural rubber latex and thus to produce adhesive tapes, since the adhesive composition possesses very high cohesion and hence optimum packaging security.

Not only for adhesive packaging tapes for sealing cartons but also for other adhesive packaging tapes, such as strapping tapes, therefore, the natural rubber-based adhesive composition must have sufficient cohesion.

Thermoplastic films based on polyvinyl chloride (PVC) are used to produce adhesive tapes by a variety of manufacturers. Particularly films based on PET are distinguished by high elongation at break and thermal stability of from 130° C. to 175° C., and resistance toward dilute alkalis and acids. Moreover, films based on polyesters possess a very high abrasion resistance and penetration resistance, but are less widespread in the field of adhesive packaging tapes owing to their relatively high price in relation to polyolefin-based films.

The PVC here may be obtained by emulsion, suspension or bulk polymerization. Copolymers based on PVC/vinyl acetate are also known.

Films based on PVC are supplied, in combination with solventborne adhesives based on natural rubber, as adhesive packaging tapes. In this case, owing to the better thermal stability, films of unplasticized PVC are used, which possess good thermal stability up to max. 105° C.

Films based on embossed PVC are likewise used in the adhesive tapes industry in combination with solventborne natural rubber compositions. By this means, a reduction in the unwind force and thus improved processing properties are achieved.

In the production of adhesive tapes with adhesive compositions based on natural rubber, both water-based and solventborne primers are used as adhesion promoters between adhesive composition and backing film. These adhesion promoters that are used possess in part a crosslinking effect on the natural-rubber-based adhesive composition which is applied from solution.

Furthermore, the films based on unplasticized PVC are distinguished by moderate penetration force and a partial resistance to petroleum spirit, oil, and alcohols. Generally speaking, the anchoring of primers to PVC films without corona treatment is better than in the case of other thermoplastic films, such as polyolefin-based films, for example. This derives from the high surface energy even without pretreatment [approximately 39 dyn/cm] and the rough surface texture of PVC films. For sufficient anchoring of adhesives based on natural rubber, a primer-coated PVC film is advisable.

It is an object of the present invention to provide adhesive tapes comprising films based on PVC and solventlessly prepared adhesive compositions based on natural rubber latex, said tapes exhibiting quiet unwind and so possessing outstanding suitability for use as packaging tapes for commercial cardboard packaging.

SUMMARY OF THE INVENTION

The invention accordingly provides an adhesive tape comprising a backing composed of a PVC-based film, in particular an oriented film, and a coating which is applied unilaterally to the film and comprises a pressure sensitive adhesive based on natural rubber latex, and a resin dispersions.

The adhesive is composed of a mixture comprising:

| | |
|---|---|
| from 30 to 65% by weight | of a natural rubber latex |
| from 35 to 70% by weight | of a resin dispersion based on a hydrocarbon resin modified on aromatics |

DETAILED DESCRIPTION

Plasticized PVC cannot be recommended without restriction for the production of adhesive packaging tapes, owing to the inadequate thermal stability of max. 60° C., but may likewise find use where appropriate.

For the adhesive tapes of the invention, particularly for ensuring reliable carton sealing, it is preferred to use films based on unplasticized PVC.

The thicknesses of the films are preferably between 20 and 100 µm, in particular between 30 and 50 µm.

In a further preferred embodiment of the invention, an adhesion promoter is present between the optionally flame- or corona-treated film and the adhesive layer, and guarantees the effective bonding of the adhesive composition to the film and the crosslinking of the adhesive.

The application rate of the adhesive layer is in particular from 10 to 45 g/m². In one particularly preferred version, the application rate set is from 13 to 28 g/m².

In one particularly preferred variant, the adhesives of the adhesive tapes of the invention include from 45 to 60% by weight of natural rubber latex. Also in accordance with the invention are other natural rubber latices and also mixtures of different types of natural rubber latices.

Depending on application, the following components—chosen independently of one another—may be added to the adhesive:

| | |
|---|---|
| a) from 0.1 to 5% by weight | of an aging inhibitor, |
| b) from 0.05 to 5% by weight | of a defoamer, |
| c) from 0.05 to 4% by weight, in particular from 0.3 to 3% by weight, | of an alkoxylated alkylphenol, |
| d) from 0.05 to 20% by weight | of at least one color pigment. |

With further preference, the adhesive layer contains up to 20% by weight of at least one resin dispersion based on hydrocarbon resins having a softening point of from 20° C. to 85° C.

The adhesive may in particular include from 0.05 to 20% by weight and, preferably, from 2 to 15% by weight of the additional resin dispersion.

The raw material used for the adhesive tapes of the invention is preferably standard natural rubber latex with an ammonia content of 0.7% by weight, firstly because the natural rubber latex mentioned offers price advantages and secondly because its relatively high ammonia content provides the natural rubber latex with effective stabilization. Substantially, natural rubber latex is very highly suitable for the use of adhesive compositions for adhesive tapes. Owing to the latex's very high molecular weight, the interlooping of the molecule chains, low glass transition temperature, and absence of mastication during the preparation of the adhesive compositions, adhesive compositions based on natural rubber latex display an excellent balance between adhesion and cohesion.

These properties ensure a very high level of packaging security when adhesive tapes comprising a natural rubber latex-based adhesive composition are used, especially in connection with the use of critical carton types and low temperatures.

The mechanical stability of the natural rubber latex may be critical with regard to mechanical shearing loads. Strong mechanical shearing loads lead to coagulation of the natural rubber latex, meaning that it cannot be processed. Possibilities for stabilizing the adhesive compositions based on natural rubber latex toward mechanical loads include firstly the use of appropriate stabilizing resin dispersions and secondly the use of emulsifiers.

The adhesive tapes of the invention preferably comprise natural rubber latex at between 30% to 65% by weight of the standard natural rubber latex with a high ammonia content.

Aqueous resin dispersions, i.e., dispersions of resin in water, are known. Their preparation and properties are described, for example, in "Resin Dispersions", Anne Z. Casey in Handbook of Pressure Sensitive Adhesive Technology, Second Edition, edited by Donatas Satas, Van Nostrand Reinhold New York, pp. 545–566.

Dispersions of hydrocarbon resins are likewise known and are offered, for example, by Hercules BV under the trade name Tacolyn.

For the adhesive tapes of the invention, resin dispersions based on modified hydrocarbon resins as principal resin component are used. The adhesive comprises between 35 to 70% by weight of the resin dispersion and preferably between 40 to 55% by weight of the resin dispersion. The solids content of the resin dispersion is in particular between 40 and 70% by weight, preferably between 45 and 60% by weight.

Also in accordance with the invention is the use of resin dispersions based on mixtures of different hydrocarbon resins and also on mixtures of inventive hydrocarbon resins with other resins.

Likewise known are resin dispersions based on modified hydrocarbons, and of particular interest in this context are C5/C9 hydrocarbon resin dispersions which have been modified with aromatics. The polarity of the resin dispersion and thus of the adhesive composition may be adjusted by way of the proportion of aromatics. As well as the polarity of the adhesive composition, the hardness of the resin is influenced. The lower the aromatics content, the lower the polarity of the modified hydrocarbon resin dispersion. By this means it is possible to carry out direct setting of the unwind behavior of the adhesive tape with a polar backing based on PVC.

As a result of a very high aromatics content in the resin dispersion and thus a high polarity of the adhesive, the unwind force of the adhesive packaging tape when a PVC backing is used is greatly increased. This leads to restricted usefulness in the sector of the packaging industry, since because automatic packaging machines are used the requirement is for a low to moderate unwind force of the PVC-based adhesive packaging tapes (4–6 N/cm).

Consequently, the resin dispersion is based on an aromatics-modified hydrocarbon resin having an aromatics content of in particular from 10 to 45% in relation to the aliphatic constituents.

Aging inhibitors for adhesives based on natural rubber are known. Three different kinds of aging inhibitor are used in particular as antioxidants for adhesives: aging inhibitors based on amines, on dithiocarbamates, and on phenols. Phenol-based aging inhibitors are very effective under the influence of UV radiation and sunlight.

For the adhesive tapes of the invention, phenol-based aging inhibitors are used. The adhesive comprises in particular from 0.1 to 5% by weight of an aging inhibitor based on phenols. Also in accordance with the invention is the use of other types of aging inhibitor, such as aging inhibitors based on amines and dithiocarbamates, for example.

Organic and inorganic pigments for adhesives based on natural rubber are known. For the coloring of adhesives based on natural rubber, use is made in particular of titanium dioxide or of titanium dioxide in combination with different-colored color pigments. For the adhesive tapes of the invention, suitable organic and/or inorganic color pigments are used in dispersion form. The adhesive preferably comprises from 0.05 to 20% by weight of an organic and/or inorganic color pigment. Also in accordance with the invention is the use of pigments based on mixtures of different organic and inorganic pigments.

The use of alkoxylated alkylphenols as plasticizers is proposed, inter alia, in "Modification of Acrylic Dispersions", Alexander Zettl in Handbook of Pressure Sensitive Adhesive Technology, Second Edition, edited by Donatas Satas, Van Nostrand Reinhold New York, p. 471. The properties of the alkoxylated alkylphenols are determined by the alkyl radical and predominantly by the structure of the polyglycol ether chain. In one preferred version, propoxylated alkylphenol is used. Water-soluble alkoxylated alkylphenols are preferred.

The use of alkylphenol polyglycol ethers as emulsifiers for stabilizing the natural rubber latex dispersion adhesive composition is proposed, inter alia, in "Compounding Natural Latex in water-based PSAs", Richard C. Oldack and Robert E. Bloss in Adhesive Age, April 1979, pp. 38–43.

The properties and the stabilizing effect of the alkoxylated alkylphenols or, generally, of the polyethyleneoxyethanolate condensates are determined predominantly by the polyglycol ether chain. A correlation has been found in this context between the length of the polyglycol ether chain and the stabilizing effect on natural rubber latex.

The adhesives of the invention may comprise from 0.05 to 5% by weight of alkoxylated alkylphenol, in one preferred version from 1.0 to 3% by weight.

The adhesive tapes of the invention may be produced by the known methods. An overview of customary production methods can be found, for example, in "Coating Equipment", Donatas Satas in Handbook of Pressure Sensitive Adhesive Technology, Second Edition edited by Donatas Satas, Van Nostrand New York, pp. 708–808. The known methods of drying and slitting the adhesive tapes are likewise to be found in the Handbook.

The adhesive tapes of the invention are suitable for a large number of adhesive tape applications. One important field of application is that of packaging applications. The adhesive tapes are suitable for use as carton sealing tapes, general adhesive packaging tapes, strapping tapes, and adhesive tapes for sealing plastic packaging and plastic bags. The adhesive tapes are suitable for pallet securement. Further applications are the bundling of loose goods and goods for transit, such as pipes, planks, etc. The adhesive tapes of the invention may be used to secure, for example, refrigerators and other electrical and electronic appliances when in transit. Further applications include label protection, surface protection, in the construction sector, for example, and tear-open strips for packaging. Applications within the office sector are also possible.

The adhesive packaging tapes have running lengths in particular of 66, 100 and 1000 m. Common roll widths chosen are 18, 24, 36, 48, 50 and 72 mm.

The preferred colors are brown, white, and transparent. Printing is carried out on rolls 144 or 150 mm in width, which are then again slit to the abovementioned widths.

In addition, adhesive tapes with a film based on polyvinyl chloride and an adhesive layer applied unilaterally to the film, prepared from a mixture comprising from 30 to 65% by weight of a natural rubber latex and from 35 to 70% by weight of a resin dispersion based on a hydrocarbon resin, are suitable for the specified applications, such as, for example, packaging applications. The adhesive tapes and also corresponding advantageous embodiments likewise serve as carton sealing tapes, general adhesive packaging tapes, strapping tapes, and adhesive tapes for sealing plastic packaging and plastic bags. The adhesive tapes are suitable for pallet securement.

The advantageous embodiments correspond to those of the adhesive tape of the invention with the aromatics-modified adhesive, although in this case the adhesive does not feature the modification specified.

The intention of the text below is to illustrate the invention, with reference to examples, without wishing unnecessarily to restrict the invention.

EXAMPLES

Example 1

Example a1: Film
A film based on PVC is used.

| | |
|---|---|
| Film thickness | 38 μm |
| Designation | AD-R240/01Fb130000 |
| Company/manufacturer | Kalle Pentaplast |

Example b: Components
Components used:

| | |
|---|---|
| b1 | of the adhesive composition |
| b1.1 | natural rubber latex obtainable from Weber & Schaer, Hamburg; (solids content 60%) |
| b1.2.1 | aqueous resin dispersion based on hydrocarbon resins (from Hercules BV, Tacolyn 1070, solids content 55% by weight; softening point 70° C. with aromatics fraction of 30%) |
| b.1.3 | aging inhibitor AD112 from Synthomer GmbH, Frankfurt |
| b1.4 | defoamer Foamaster 306 from Henkel, Düsseldorf |
| b2 | of the primer |
| b2.1 | Trapylen 6965W (polypropylene dispersion with low degree of chlorination, from Tramaco, Hamburg) |
| b2.2 | Butofan LS103/styrene-butadiene latex from BASF |

Example c: Formulations
c1 formulation A of the adhesive
The formulation is given in % by weight:

| | |
|---|---|
| Natural rubber latex dispersion | 52% by weight |
| Tacolyn 1070 | 47% by weight |
| Aging inhibitor | 0.7% by weight |
| Defoamer | 0.3% by weight | c2 formulation B of the primer
The formulation is given in % by weight:

| | |
|---|---|
| Trapylen 6965W | 50% by weight |
| Butofan LS103 | 50% by weight |

Example d: Preparation of the adhesive and of the primer
The adhesive A to be coated is prepared as follows:
d1 the resin dispersion is added to the natural rubber latex at 23° C. with continual stirring with a customary mechanical stirrer. This is followed by careful stirring for 15 minutes more.
d2 the aging inhibitor and the defoamer are stirred carefully into the mixture from step 1 (d1). Stirring is then continued for 15 minutes. This is followed by coating.
The primer with formulation B is prepared as follows:
d3 Trapylen 6965W and Butofan LS103 are mixed and used without further pretreatment.

Example e: Coating
The film a is coated with the primer formulation B and with the adhesive formulation A by means of a wire doctor. In a first step the primer is applied, and briefly dried at from 80 to 90° C., and directly thereafter in a second step (inline or offline) the adhesive is applied to the primer layer.

The wire doctor and the coating speed are adjusted such that after drying of the coated film an adhesive application rate of approximately 18 g/m² is measured and a primer application rate of from 0.6 to 0.8 g/m² is measured. Coating takes place on a pilot coating plant with an operating width of 500 mm and at a coating speed of 10 m/min. Downstream of the coating station with its wire doctor applicator there is a drying tunnel which is operated with hot air (approximately 70° C.). The coated film was processed in a width of 50 mm and a length of 60 m.

The technical adhesive data are determined following storage at 23° C. for two days and following storage at 23° C. for from one to three months.

Example f: Results

The test methods used are briefly characterized below:

To determine the adhesive application rate, a circular specimen of known surface area is cut from the coated film and weighed. The adhesive composition is then removed using petroleum spirit and the film, now free of adhesive composition, is weighed again. The adhesive application rate, in g/m², is calculated from the difference.

To characterize the tack with respect to cardboard, the adhesive tape is applied to the cardboard using a standard commercial manual roller and is pressed on using a steel roller weighing 2 kg (overrolling twice). After a waiting time of 3 minutes, the adhesive tape is peeled off parallel at a speed of about 30 m/min and at an angle of approximately 130° to the cardboard surface. The tack with respect to cardboard is assessed qualitatively on the basis of the amount of paper fibers torn out, in comparison with a standard commercial adhesive packaging tape such as tesa-pack 4124 from Beiersdorf, whose tack is characterized very well.

To determine the Packaging security a standard carton (dispatch carton; 425 mm×325 mm×165 mm: length× breadth×height: from Europakarton; constructed from bicorrugated cardboard with a 125 g/m² kraftliner outer ply) is sealed with the adhesive tape using a standard commercial automatic packer (Knecht, model 6030 and sealing unit 6230, setting without braking path). The adhesive tape is applied centrally in a standard U-shaped seal so that 60 mm of adhesive tape are bonded at each of the end faces. Before sealing, the carton is completely filled with peas and is stored lying on its side face at 40° C. and at 23° C. The packaging security is characterized as being very good if the carton remains sealed for more than 30 days. Also characterized and described are the slippage of the adhesive tape on the carton and, respectively, the behavior of the adhesive tape at the bonded areas, and these qualities are compared with the reference adhesive tape (table 1 et seq.).

The unwind noise is determined with the adhesive tape being unwound at a speed of 45 m/min. The unwind noise is measured in dB (A) at a distance of 25 cm from the center of the roll of adhesive tape, using a standard commercial sound level meter from Bruël & Kjear (type 2226). A measured sound level less than 83 dB (A) is classed as quiet.

The unwind force is measured at constant unwind speed (30 m/min) by measuring the torque and calculating the unwind force, in N/cm, in accordance with the known formulae.

The results of the investigation of an inventive adhesive tape with film and its assessment in relation to comparative adhesive tapes are given in table 1.

TABLE 1

Characteristics of the adhesive tapes of the invention

| Structure/ storage time/ temperature | Sample A with single film | Sample T1 |
|---|---|---|
| Adhesive | Adhesive A | Tesa 4124 Natural rubber solvent adhesive |
| Backing | film a1 | film a1 |
| Primer | formulation B | |
| Adhesive application rate [g/m²] | 23 | 24 |
| Application rate, primer layer [g/m²] | 0.8 | |
| Anchoring of adhesive | good | good |
| Unwind behavior [loud/quiet] | quiet | quiet |
| Packaging security | very good | very good |
| Tack on cardboard | good | very good |

Sample A: sample of the adhesive tapes of the invention

Example 2

Example a: Film

A film based on PVC is used.

| Film thickness | 38 µm |
|---|---|
| Designation | AD-R240/01Fb130000 |
| Company/manufacturer | Kalle Pentaplast |

| b1 | of the adhesive composition |
| b1.1 | natural rubber latex obtainable from Weber & Schaer, Hamburg; (solids content 60%) |
| b1.2.1 | aqueous resin dispersion based on hydrocarbon resins (from Hercules BV, Tacolyn 1070, solids content 55% by weight; softening point 70° C. with aromatics fraction of 30%) |
| b.1.3 | aging inhibitor AD112 from Synthomer GmbH, Frankfurt |
| b1.4 | defoamer Foamaster 306 from Henkel, Düsseldorf |
| b2 | of the primer |
| b2.1 | Trapylen 6965W (polypropylene dispersion with low degree of chlorination, from Tramaco, Hamburg) |
| b2.2 | Butofan LS103/styrene-butadiene latex from BASF |

Example c: Formulations c1 formulation A of the adhesive

The formulation is given in % by weight:

| Natural rubber latex dispersion | 52% by weight |
|---|---|
| Tacolyn 1070 | 47% by weight |
| Aging inhibitor | 0.7% by weight |
| Defoamer | 0.3% by weight | c2 formulation B of the primer

The formulation is given in % by weight:

| Trapylen 6965W | 50% by weight |
|---|---|
| Butofan LS103 | 50% by weight |

Example d: Preparation of the adhesive and of the primer

The adhesive A to be coated is prepared as follows:

d1 the resin dispersion is added to the natural rubber latex at 23° C. with continual stirring with a customary mechanical stirrer. This is followed by careful stirring for 15 minutes more.

d2 the aging inhibitor and the defoamer are stirred carefully into the mixture from step 1 (d1). Stirring is then continued for 15 minutes. This is followed by coating.

The primer with formulation B is prepared as follows:

d3 Trapylen 6965W and Butofan LS103 are mixed and used without further pretreatment.

Example e: Coating

The film a is coated with the primer formulation B and with the adhesive formulation A by means of a wire doctor. In a first step the primer is applied, and briefly dried at from 80 to 90° C., and directly thereafter in a second step (inline or offline) the adhesive is applied to the primer layer.

The wire doctor and the coating speed are adjusted such that after drying of the coated film an adhesive application rate of approximately 18 g/m² is measured and a primer application rate of from 0.6 to 0.8 g/m² is measured. Coating takes place on a pilot coating plant with an operating width of 500 mm and at a coating speed of 10 m/min. Downstream of the coating station with its wire doctor applicator there is a drying tunnel which is operated with hot air (approximately 70° C.). The coated film was processed in a width of 50 mm and a length of 60 m.

The technical adhesive data are determined following storage at 23° C. for two days and following storage at 23° C. for from one to three months.

Example f: Results

The results of the investigation of an inventive adhesive tape with adhesive comprising aromatics-modified hydrocarbon resins, and its assessment in relation to comparative adhesive tapes, are given in table 2.

TABLE 2

Characteristics of the adhesive tapes of the invention

| Structure/ storage time/ temperature | Sample B | tesa Pack 4124 |
|---|---|---|
| Technology | NR latex | NR solvent |
| Backing | Film a | Film a |
| Primer | Formulation B | |
| Adhesive | Formulation A | |
| Aromatics fraction of the resin used [% by weight] | 30 | |
| Adhesive application rate [g/m²] | 24 | 24 |
| Application rate, primer layer [g/m²] | 0.8 | 0.8 |
| Anchoring of adhesive | good | very good |
| Unwind behavior [loud/quiet] | quiet | quiet |
| Unwind force at 30 m/min [N/cm] | 4.9 | 5.2 |
| Packaging security | very good | very good |

Sample B: sample of the adhesive tapes of the invention

Example 3

Example a: Film

A film based on PVC is used.

| Film thickness | 38 μm |
|---|---|
| Designation | AD-R240/01Fb130000 |
| Company/manufacturer | Kalle Pentaplast |

Example b2: Components

Components used:

| | |
|---|---|
| b1 | of the adhesive composition |
| b1.1 | natural rubber latex obtainable from Weber & Schaer, Hamburg; (solids content 60%) |
| b1.2.2 | aqueous resin dispersion based on aromatics-modified hydrocarbon resins (from Hercules BV, MBG193, solids contents 50% by weight; softening point 85° C. with an aromatics fraction of 50%) |
| b.1.3 | aging inhibitor AD112 from Synthomer GmbH, Frankfurt |
| b1.4 | defoamer Foamaster 306 from Henkel, Düsseldorf |
| b2 | of the primer |
| b2.1 | Trapylen 6965W (polypropylene dispersion with low degree of chlorination, from Tramaco, Hamburg) |
| b2.2 | Butofan LS103/styrene-butadiene latex from BASF |

Example c: Formulations c1 formulation A of the adhesive

The formulation is given in % by weight:

| Natural rubber latex dispersion | 52% by weight |
|---|---|
| MBG 193 | 47% by weight |
| Aging inhibitor | 0.7% by weight |
| Defoamer | 0.3% by weight | c2 formulation B of the primer

The formulation is given in % by weight:

| Trapylen 6965W | 50% by weight |
|---|---|
| Butofan LS103 | 50% by weight |

Example d: Preparation of the adhesive and of the primer

The adhesive A to be coated is prepared as follows:

d1 the resin dispersion is added to the natural rubber latex at 23° C. with continual stirring with a customary mechanical stirrer. This is followed by careful stirring for 15 minutes more.

d2 the aging inhibitor and the defoamer are stirred carefully into the mixture from step 1 (d1). Stirring is then continued for 15 minutes. This is followed by coating.

The primer with formulation B is prepared as follows:

d3 Trapylen 6965W and Butofan LS103 are mixed and used without further pretreatment.

Example e: Coating

The film a is coated with the primer formulation B and with the adhesive formulation A by means of a wire doctor. In a first step the primer is applied, and briefly dried at from 80 to 90° C., and directly thereafter in a second step (inline or offline) the adhesive is applied to the primer layer.

The wire doctor and the coating speed are adjusted such that after drying of the coated film an adhesive application rate of approximately 18 g/m² is measured and a primer application rate of from 0.6 to 0.8 g/m² is measured. Coating takes place on a pilot coating plant with an operating width of 500 mm and at a coating speed of 10 m/min. Downstream of the coating station with its wire doctor applicator there is a drying tunnel which is operated with hot air (approximately 70° C.). The coated film was processed in a width of 50 mm and a length of 60 m.

The technical adhesive data are determined following storage at 23° C. for two days and following storage at 23° C. for from one to three months.

Example f: Results

The results of the investigation of an inventive adhesive tape with adhesive comprising aromatics-modified hydrocarbon resins, and its assessment in relation to comparative adhesive tapes, are given in table 3.

TABLE 3

Characteristics of the adhesive tapes of the invention

| Structure/<br>storage time/<br>temperature | Sample C | tesa Pack 4124 |
| --- | --- | --- |
| Technology | NR latex | NR solvent |
| Backing | Film a | Film a |
| Primer | Formulation B | |
| Adhesive | Formulation A | |
| Aromatics fraction of the resin used | 45% | |
| Adhesive application rate [g/m$^2$] | 24 | 24 |
| Application rate, primer layer [g/m$^2$] | 0.8 | 0.8 |
| Anchoring of adhesive | very good | very good |
| Unwind behavior [loud/quiet] | loud | quiet |
| Unwind force at 30 m/min [N/cm] | 7.8 | 5.2 |
| Packaging security | very good | very good |

Sample C: sample of the adhesive tapes of the invention

The invention claimed is:

1. An adhesive tape comprising
   a. a polyvinyl chloride film and
   b. an adhesive layer applied to one side of the film, formed from a mixture comprising
      from 30 to 65% by weight of a natural rubber latex
      from 35 to 70% by weight of a dispersion of a hydrocarbon resin modified with aromatics wherein said dispersion of hydrocarbon resin is a dispersion of $C_5$–$C_9$ hydrocarbon resin having an aromatics content of from 10–45% in relation to the aliphatic constituents of said hydrocarbon resin, and said dispersion has a solids content of 40 to 70% by weight.

2. The adhesive tape as claimed in claim 1, wherein the polyvinyl chloride film is unplasticized.

3. The adhesive tape as claimed in claim 1, having a layer of a primer between the polyvinyl chloride film and the adhesive layer.

4. The adhesive tape as claimed in claim 1, wherein the amount of adhesive in said adhesive layer is from 10 to 45 g/m$^2$.

5. The adhesive tape as claimed in claim 1, wherein the adhesive layer contains up to 20% by weight of at least one resin dispersion wherein the dispersed resins are hydrocarbon resins having a softening point of from 20° C. to 85° C.

6. The adhesive tape as claimed in claim 1, wherein the adhesive layer contains.

| | |
| --- | --- |
| from 0.1 to 5% by weight | of an aging inhibitor, |
| from 0.05 to 5% by weight | of a defoamer, |
| from 0.05 to 4% by weight | of an alkoxylated alkylphenol, and/or |
| from 0.05 to 20% by weight | of at least one color pigment. |

7. The adhesive tape as claimed in claim 6, wherein said amount of alkoxylated alkylphenol is from 0.3 to 3% by weight.

8. The adhesive tape as claimed in claim 1, wherein said polyvinyl chloride film has a thickness of between 25 and 70.

9. A method of sealing a carton which comprises sealing said carton with an adhesive tape of claim 1.

* * * * *